US012802592B2

(12) United States Patent
Hoglander et al.

(10) Patent No.: US 12,802,592 B2
(45) Date of Patent: Nov. 17, 2026

(54) MULTI-LAYER TAG SYSTEM AND METHOD

(71) Applicant: Etiflex Corp., Hallandale Beach, FL (US)

(72) Inventors: Bruce Hoglander, Acworth, GA (US); Alicia Gomelsky Margulis, Miami, FL (US); Norberto Julio Margulis, Aventura, FL (US)

(73) Assignee: Etiflex Corp., Hallandale Beach, FL (US)

( * ) Notice: Subject to any disclaimer, the term of this patent is extended or adjusted under 35 U.S.C. 154(b) by 0 days.

(21) Appl. No.: 19/391,272

(22) Filed: Nov. 17, 2025

(65) Prior Publication Data

US 2026/0162565 A1 Jun. 11, 2026

Related U.S. Application Data

(60) Provisional application No. 63/730,563, filed on Dec. 11, 2024.

(51) Int. Cl.

| | |
|---|---|
| ***G09F 3/02*** | (2006.01) |
| ***B32B 3/30*** | (2006.01) |
| ***B32B 7/023*** | (2019.01) |
| ***B32B 27/08*** | (2006.01) |

(52) U.S. Cl.

CPC .................. *G09F 3/02* (2013.01); *B32B 3/30* (2013.01); *B32B 7/023* (2019.01); *B32B 27/08* (2013.01); *B32B 2250/02* (2013.01); *B32B 2250/03* (2013.01); *B32B 2250/24* (2013.01); *B32B 2307/4026* (2013.01); *B32B 2425/00* (2013.01); *G09F 2003/0258* (2013.01)

(58) Field of Classification Search

CPC ..... G09F 3/02; G09F 2003/0258; B32B 3/30; B32B 2307/4026

See application file for complete search history.

(56) References Cited

U.S. PATENT DOCUMENTS

| | | | | |
|---|---|---|---|---|
| 2,001,679 | A | 5/1935 | Haughey | |
| 4,597,814 | A | 7/1986 | Colgate, Jr. | |
| 5,860,235 | A * | 1/1999 | Bilbie | G09F 3/10 40/594 |
| 7,013,536 | B2 | 3/2006 | Golden et al. | |
| 7,150,119 | B1 * | 12/2006 | Nudo, Jr. | G09F 15/02 428/138 |

(Continued)

*Primary Examiner* — Gary C Hoge

(74) *Attorney, Agent, or Firm* — McCarter & English, LLP

(57) ABSTRACT

A multi-layer tag includes a first/top layer fabricated from a first material that is a first color and a second/lower layer in abutting relation to the first/top layer, the second/lower layer fabricated from a second material that is a second color. The first/top layer includes engraved region(s) that expose portion(s) of the second/lower layer. The first color may be a contrasting color relative to the second color and at least one of the first/top layer and the second/lower layer may be pre-molded with information. A method for fabricating a multi-layer tag includes molding a first/top layer from a first material characterized by a first color, molding a second/lower layer in abutting relation to the first/top layer, the second/lower layer fabricated from a second material that is a second color that contrasts relative to the first color. Engraving the first/top layer defines engraved region(s) that expose portion(s) of the second/lower layer.

12 Claims, 14 Drawing Sheets

(56) References Cited

U.S. PATENT DOCUMENTS

| | | | | |
|---|---|---|---|---|
| 8,490,882 | B2 * | 7/2013 | Margulis | G06K 19/07749 235/492 |
| 9,262,710 | B2 | 2/2016 | Margulis et al. | |
| 10,347,159 | B2 * | 7/2019 | Terstiege | G09F 7/165 |
| 11,417,244 | B1 | 8/2022 | Margulis et al. | |
| 2004/0161565 | A1 | 8/2004 | Dronzek | |
| 2004/0201112 | A1 | 10/2004 | Divigalpitiya et al. | |
| 2005/0128086 | A1 | 6/2005 | Brown et al. | |
| 2006/0088682 | A1 | 4/2006 | Dronzek | |
| 2006/0226235 | A1 | 10/2006 | Shepherd et al. | |
| 2007/0126226 | A1 | 6/2007 | Kolodzie et al. | |
| 2008/0136588 | A1 | 6/2008 | Carter et al. | |
| 2008/0292856 | A1 | 11/2008 | Garner et al. | |
| 2008/0309497 | A1 | 12/2008 | Bryant | |
| 2009/0004236 | A1 | 1/2009 | Kellerby | |
| 2009/0031594 | A1 | 2/2009 | Kosmin | |
| 2009/0038742 | A1 * | 2/2009 | Komatsu | B44C 1/22 156/154 |
| 2009/0289107 | A1 | 11/2009 | Prentice | |
| 2011/0265292 | A1 | 11/2011 | Kirby et al. | |
| 2012/0280103 | A1 * | 11/2012 | Forster | B31D 1/024 248/342 |
| 2013/0193214 | A1 | 8/2013 | Margulis et al. | |
| 2017/0061834 | A1 * | 3/2017 | Versluys | G09F 3/0291 |
| 2017/0098395 | A1 * | 4/2017 | Terstiege | G09F 7/165 |
| 2018/0225997 | A1 * | 8/2018 | Raming | G09F 3/0288 |
| 2022/0309959 | A1 * | 9/2022 | Feldman | G09B 21/003 |

* cited by examiner

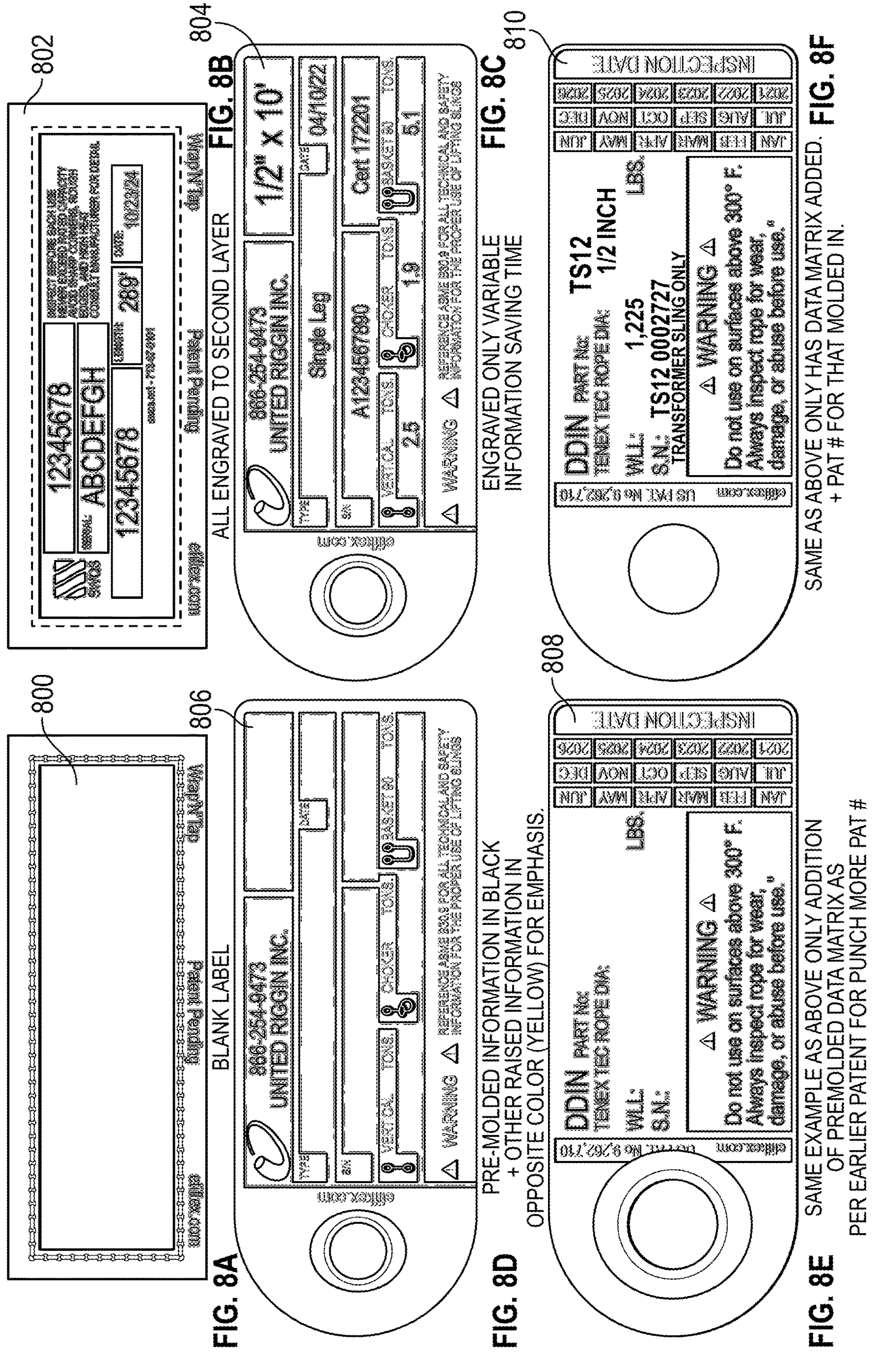

FIG. 8A
800
eliflex.com
Patent Pending
Wrap'N'Tap
BLANK LABEL
FIG. 8B
802
SERIAL:
12345678
ABCDEFGH
12345678
LENGTH:
289'
DATE:
10/23/24
ALL ENGRAVED TO SECOND LAYER
FIG. 8C
804
866-254-9473
UNITED RIGGIN INC.
TYPE
Single Leg
1/2" x 10'
DATE
04/10/22
S/N
A1234567890
Cert 172201
VERT.CAL.
TONS
2.5
CHOKER
TONS
1.9
BASKET 90
TONS
5.1
WARNING
REFERENCE ASME B30.9 FOR ALL TECHNICAL AND SAFETY INFORMATION FOR THE PROPER USE OF LIFTING SLINGS
eliflex.com
ENGRAVED ONLY VARIABLE INFORMATION SAVING TIME
FIG. 8D
806
866-254-9473
UNITED RIGGIN INC.
TYPE
DATE
S/N
VERT.CAL.
TONS
CHOKER
TONS
BASKET 90
TONS
WARNING
REFERENCE ASME B30.9 FOR ALL TECHNICAL AND SAFETY INFORMATION FOR THE PROPER USE OF LIFTING SLINGS
eliflex.com
PRE-MOLDED INFORMATION IN BLACK + OTHER RAISED INFORMATION IN OPPOSITE COLOR (YELLOW) FOR EMPHASIS.
FIG. 8E
808
US PAT. No 9,262,710
eliflex.com
DDIN PART No:
TENEX TEC ROPE DIA:
WLL:
S.N.:
LBS.
WARNING
Do not use on surfaces above 300° F.
Always inspect rope for wear, damage, or abuse before use.
INSPECTION DATE
JAN FEB MAR APR MAY JUN
JUL AUG SEP OCT NOV DEC
2021 2022 2023 2024 2025 2026
SAME EXAMPLE AS ABOVE ONLY ADDITION OF PREMOLDED DATA MATRIX AS PER EARLIER PATENT FOR PUNCH MORE PAT #
FIG. 8F
810
US PAT. No 9,262,710
eliflex.com
DDIN PART No: TS12
TENEX TEC ROPE DIA: 1/2 INCH
WLL: 1,225 LBS.
S.N.: TS12 0002727
TRANSFORMER SLING ONLY
WARNING
Do not use on surfaces above 300° F.
Always inspect rope for wear, damage, or abuse before use.
INSPECTION DATE
JAN FEB MAR APR MAY JUN
JUL AUG SEP OCT NOV DEC
2021 2022 2023 2024 2025 2026
SAME AS ABOVE ONLY HAS DATA MATRIX ADDED. + PAT # FOR THAT MOLDED IN.

MULTI-LAYER TAG SYSTEM AND METHOD

1. CROSS-REFERENCE TO RELATED APPLICATION

The present application claims priority benefit to a U.S. provisional patent application entitled "Multi-Layer Tag System and Method," which was filed on Dec. 11, 2024, and assigned Ser. No. 63/730,563. The entire content of the foregoing U.S. provisional patent application is incorporated herein by reference.

2. TECHNICAL FIELD

The present disclosure is directed to a multi-layer tag system and to method(s) for manufacture and use thereof.

3. BACKGROUND ART

In the United States, industry is increasingly required to provide more information and verification of its operations, including safety apparatus, supply chain components, tools and machinery, inspection and maintenance records, and general records in relation to assets and operations. This has been emphasized in some industries that have harsh environments or rough working conditions that may also be subject to continued exposure to the outdoors. There are many factors to consider with labeling in these industries, including abrasion, exposure to UV rays and common chemical compounds, including petroleum fuels and petrochemicals. A few examples of these industries are mining, construction, oil and gas, utilities, marine, aviation and space, and manufacturing plants/facilities more generally.

For example, in the lifting and rigging industry, durable tagging is essential for a multi-billion industry that indirectly touches most people's daily lives. In this industry, if the tags are not legible, then the product with which it is associated must be removed from service. Therefore, tags are required that offer durable construction and incorporate effective ways for providing data, inspection records and/or critical information concerning the item for ready inspection and reliance by industry users. This industry deals with harsh and extreme outdoor environments as well as rough and demanding usage. In these environments, further improvements in in labeling and identification are needed, specifically labeling/identification techniques that are durable and that allow recordation of information in an easily readable format that will last without fading or rubbing off.

Currently there are four (4) principal types of tags commonly in use:

1.) Printed vinyl tags;
2.) Printed tags that are laminated on both sides with a soft clear PVC;
3.) Printed metal tags with the data fields engraved; and
4.) Molded 3-D tags with data fields laser engraved (available from Etiflex Corp., Hallandale Beach, FL).

The first two tags do not offer a complete solution, but are widely used in view of their low cost and ease of use.

Printed vinyl tags generally take the form of a plastic, flexible one-color material that is printed and then die cut to size. The required variable information is often written onto the tag with a permanent marker like a "Sharpie" (Newell Rubbermaid, Inc., Atlanta, GA). Although a printed vinyl tag will work in some applications, like a wall mounted fire extinguisher that has no exposure or wear, conventional vinyl tags are not effective in industries that require durability because, inter alia, the printing wears off with light abrasion or exposure to many common cleaning solvents and petro-chemicals. In addition, information that is written onto the tag, e.g., with a marker, is prone to fade with UV exposure and rubs off with light abrasion or is dissolved by solvents even quicker than printed information. Vinyl labels may also be laser engraved, but the engraved information will fade in use in many industrial applications and, although the engraved mark may remain, it has no meaning if the associated printed information on the label has rubbed off and cannot be read.

A problem with the second type of label, wherein the tag is laminated on both sides, is that abrasion combined with dirt will function to scratch the label, making it difficult to read the data in short order. Another problem with this label is that the clear cover may also cut, rip and separate fairly easily and, when this happens, moisture enters the label and forms condensation or affects the printing, thereby making the label illegible.

As noted above, a third type of conventional tag is a metal tag. Metal tags do not allow multi-color contrasting engraving. Another disadvantage of a metal tag is that it is rigid and can be a safety hazard as it conducts electricity, and friction can cause a spark that could ignite materials or trigger an explosion. Metal tags can also be hazardous if the tag becomes detached (or is inadvertently dropped) at height, as in oil and gas applications, lifting applications/activities, and construction applications. Additionally, metal tags can cause damage to other items that are contacted and, in some cases, even cut the item to which it is installed/attached, e.g., synthetic rope or fabric-covered lifting slings. Metal tags are frequently difficult to read, so metal tags are often printed with ink or coated with a material that differentiates in color from the metal material of the tag to provide regions/titles for each engraved area. The problem with this is that normal abrasion removes the printing, and the tag is thereby rendered unreadable.

Laser engraving of a one layer material with raised/3-D borders and text has been implemented by the applicant, commercially offering molded tags with engraving capabilities. This design surpassed conventional printed tags that were being laser marked because the raised 3-D information was superior to the printed tags and much more durable. The engraving process, however, was similar on the printed and the 3-D tags. In both tags, the engraving was durable and always resulted in a light brown color of burned material. Although this was particularly effective for light duty or indoor labels, the more demanding applications could not be easily read after a relatively short time in service. Specifically, over time the brown burned color faded back to the color of the material being engraved. Although the mark was still there, the mark was difficult to see because it faded to be the same color as the material. This was not an ideal situation, especially where critical information like maximum capacity of the item tagged was the information being engraved.

The figures appended hereto depict commercially available tags that have limitations in the field, as follows:

FIGS. 1A-1G (prior art) depict tags that are commercially available from the applicant (tags 100, 102, 104, 106, 108, 110, 112, respectively). The inherent problem with engraving a single layer of color on a label would manifest based on use of these 3-D labels. Regardless of what color is used, when single color material is laser engraved, the laser burns a mark into the material leaving a dark layer of burned material and residue behind to create the mark. This residue fades with exposure to UV light, outdoor exposure and cleaning chemicals and ends up being the original color of the label, thereby leaving the engraved mark with limited and/or no contrast and difficult to read.

FIGS. 2A-2H (prior art) depict commercially available tags that are used for lifting slings and ropes (tags 200, 202A/202B, 204, 206A/206B, 208, 210, respectively). The depicted tags include printed labels using various types of material as a substrate. Each one of the samples was pulled across a concrete block to simulate use in the field where the tags encounter many types of abrasion from a range of sources, including construction sites, factory environments, utility maintenance and the like. The number of pulls required to make the text illegible in testing was as follows:

Tag 200: 4 pulls
Tag 202A/202B: 2 pulls
Tag 204: 3 pulls
Tag 206A/206B: 1 pull
Tag 208: 5 pulls
Tag 210: 8 pulls FIG. 3 (prior art) depicts a commercially available printed label (300) that is multi-color and that includes a clear protective cover that is sewn over the label. The clear cover is soft so that it is able to remain flexible, and the clear cover easily scratches, much like a lens, thereby rendering the label text illegible. Another problem with this label is that the clear cover also cuts, rips and separates fairly easily and, when this happens, moisture enters the label and forms condensation or affects the printing, thereby making the label illegible.

FIGS. 4A-4D (prior art) depict additional types of non-molded, commercially available engraved tag materials—tag 400 (leather), tag 402 (printed), and tag 404A/404B (metal), respectively. The leather and printed labels both fade with exposure, while the metal label does not change color when it is engraved. All three materials are difficult to read without contrast.

FIG. 5 (prior art) depicts a flexible two-color, commercially available tag material (500), in which the engraver cuts through the top layer into a different color; however, the top layer is thin and susceptible to abrasion. This label also can only offer two colors unless printing is added, which then is susceptible to the same problems as described with reference to the labels depicted in FIGS. 2A-2H. In addition, this format does not allow for three (3) levels of information with separate designated colors for information like warnings, etc.

In the patent literature, U.S. Patent Publication No. 2007/0126226 to Kolodzie et al. is directed to a two-part security sticker and associated document retrieval system, wherein the security sticker comprises one or more security features on a backing layer having opposite first and second major sides, the first major side having a transparent or translucent adhesive layer applied at least to a first part thereof and a liner on a side of the adhesive layer remote from the backing layer. The design and operation of the Kolodzie '226 security sticker results in numerous restrictions on use that significantly reduce the utility thereof, including specifically the requirement that information be marked onto the sticker before adherence to a hard surface. Indeed, the Kolodzie '226 security sticker is designed to expressly prevent the addition and/or alteration of information in the field, i.e., once it is adhered to a surface. Moreover, adherence of the Kolodzie security sticker to a surface prevents any further inspection and/or interaction with the rear surface thereof.

A need remains for tags that make it possible to provide information that is legible in a consistent, reliable and durable manner across a range of use conditions, including applications that may place the tag in an environment where abrasion and/or exposure to solvents and/or petro-chemicals is likely.

SUMMARY

According to the present disclosure, a multi-layer tag is provided that addresses the shortcomings of the tags available in the industry. The disclosed tags are particularly beneficial in that they exhibit resilience/durability when used in challenging environments. According to exemplary methods of manufacture, a process is provided to fabricate the tag from a multiple layer material, wherein a top layer is cut through with a laser engraver, thus exposing a contrasting color in a layer there below that will be not fade with time.

To facilitate the noted manufacturing process, the top layer of the multi-layer tag is advantageously fabricated to a controlled thickness, thereby enabling the laser engraving step to be effectuated so as burn through to the underlying layer (of different color) consistently and reliably time after time. Thus, the layer below the top layer is fabricated from a material that exhibits a color that contrasts with the color of the top layer. In this way, as the marking fades over time, it reveals the color of the underlying layer instead of the top layer. This results in the exposed underlying layer—designated a "bottom layer" for this purpose—getting darker over time and the contrast between the top and bottom layer increasing with time. This phenomenon is to be contrasted with the current experience in the field, where the burned color fades back into the original top layer color over time, leaving no contrast.

The disclosed multi-layer tags for deep engraving addresses and obviates the industrial use issues referenced above. The disclosed multi-layer tabs offer durability that exceeds conventional tag systems. Relevant information/indicia associated with the tagged item may be captured in a 3-D manner, with the relevant information/indicia raised, recessed or a combination of raised/recessed to facilitate protection from abrasion.

The disclosed multi-layered tags presents a multi-color—generally, two-color—contrast using a molded 3-D construction that provides an effective contrast for easier viewing/reading, whether wet or dry and from different viewing angles.

The disclosed method for multi-layered tag manufacture allows the information/indicia to be captured on the tags to be engraved by cutting through a substantial top layer of material, wherein the top layer is generally a consistent and controlled thickness. Because of the consistent/controlled thickness of the top layer, a laser engraving machine can be set/programmed to accurately burn through this top layer on a consistent/reliable basis to reveal a second layer underneath that is a contrasting color relative to the top layer.

In exemplary embodiments, once the engraving step is complete, the second/lower/bottom layer provides a protected layer of information due to the contrast with the non-engraved portion of the top layer. Protection is afforded by the recessed nature of the engraved regions—thereby, generally avoiding any potential abrasion that could undercut the visibility/readability of the information layer. The information layer may be designated by the user for recording information to be put on a product—either after acquisition of the multi-layer tag product from a supplier or in requisitioning the multi-layer tag product from a supplier, or a combination thereof.

In exemplary embodiments, individual labels may be fabricated/molded by a supplier/vendor with information in the second layer that is constant. Thereafter, the user can add/fill in the variable information using a $CO_2$ laser engraver to get to the second layer underneath/below the top/upper layer. The end result is a label where the molded-in constant information and the engraved variable information are equally durable. And since each character of engraving takes time and money, the disclosed product—where only specific variable information is engraved—saves a lot of both.

Additionally, in exemplary embodiments, a durable raised text may be added to the second/lower layer of the tag in another color than the engraved information so that it will stand out (exemplary embodiments with this differential color feature are included in FIGS. 7 and 8). This second raised text may be selected/used, inter alia, to bring attention to or separate that item from the engraved information, e.g., a warning or title of the field of engraved information, and is not possible with conventional technology/manufacturing modalities.

Thus, for example, with reference to the images included in FIGS. 6 and 7, the logo and company name (and all of the black pre-molded information) is the same depth as the engraved information. Any graphics, like the logos, are difficult and very slow to engrave, so the ability to include this information in the fabrication/molding of the label is also a big time saver.

The disclosed multi-layer tag thus offers, inter alia, recessed, protected information that is molded-in and also molded-in durable raised text for desired information, such raised text optionally in a contrasting color. In exemplary embodiments, the disclosed multi-layer tag is both flexible and durable. In exemplary embodiments, once purchased by the user, additional durable, recessed, variable information can be added to the tag by the user with a $CO_2$ laser engraver so that the additional engraved text will be as durable as the factory molded-in text. This process is extremely durable and outlasts any other flexible tagging in the marketplace. By shortening the engraving time with pre-molded information, the systems and methods of the present disclosure substantially increase the efficiency of manufacture and significantly reduce the time spent engraving information, thereby saving the user money and offering better durability.

Thus, the present disclosure contemplates a system whereby information to be captured on the multi-layer tag can be communicated to a product supplier, and such information could be engraved on the multi-layer tag before delivery of the multi-layer tag from the supplier to the purchaser/user. The supplier may manufacture "in bulk" multi-layer tags with the requested information provided by the customer/user, and further unique information could be added to the multi-layer tag post-acquisition.

The information/indicia captured on the multi-layer tag through the engraving process described herein can be expected to outlast any existing tag product on the market. The multi-layer tag system and associated manufacturing method provides custom and flexible capture of relevant information/indicia, e.g., product identification, user information, facility information, calendar-related information, product ratings, caution information, warning information, use information and/or inspection information.

The information/indicia captured on the disclosed multi-layer tags may be presented in variable fonts/sizes/colors. For example, the flexibility of the disclosed system/manufacturing technique allows the supplier and/or user to design a tag with a small font for information, such as warnings and instructions that can be in a molded 3-D raised format for durability and contrast, and a separate color for grabbing attention, This is often information in a font that is too small to be engraved or printed while maintaining readability.

Additional features, functions and benefits of the disclosed tags will be apparent from the description which follows.

BRIEF DESCRIPTION OF THE FIGURES

To assist those of skill in the art, reference is made to the figures appended hereto, wherein:

FIG. 8A depicts a blank tag;

FIGS. 8B-8C depict tags fully engraved;

FIG. 8D depicts a tag with pre-molded information;

FIGS. 8E-8F depict tags in the form that they could be supplied to a user;

DETAILED DESCRIPTION

Figure 1A:
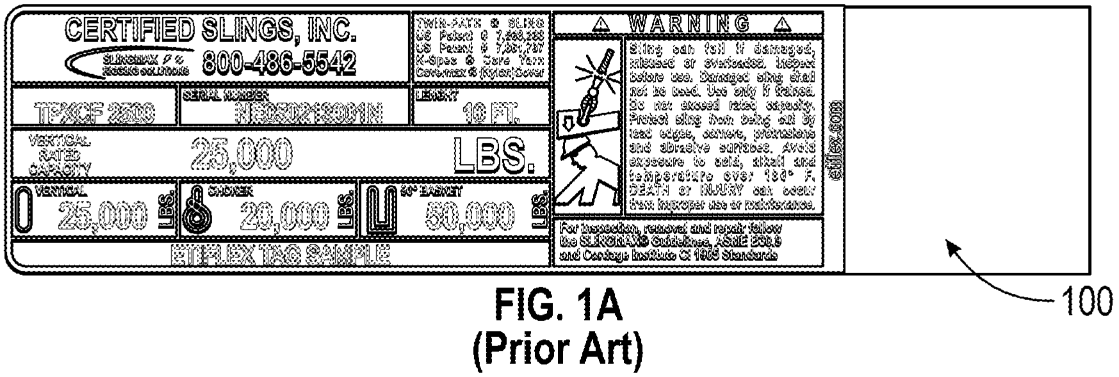
FIG. 1A (Prior Art)
FIGS. 1A-1G (prior art) depict seven (7) molded 3-D labels that are commercially available from the applicant.
Figure 1B:
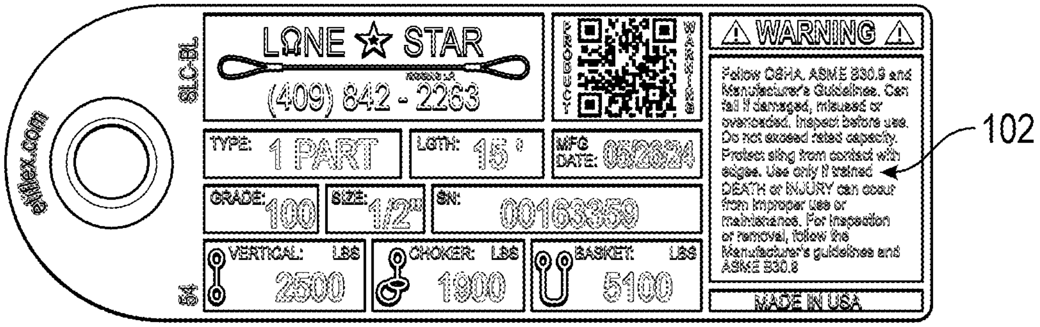
FIG. 1B (Prior Art)
Figure 1C:
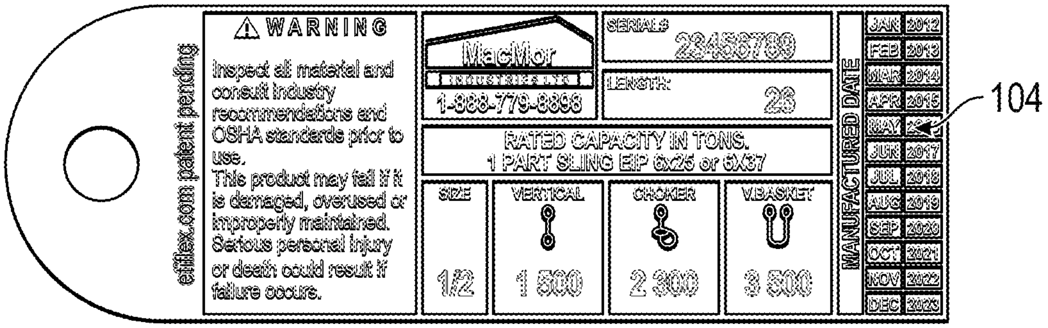
FIG. 1C (Prior Art)
Figure 1D:
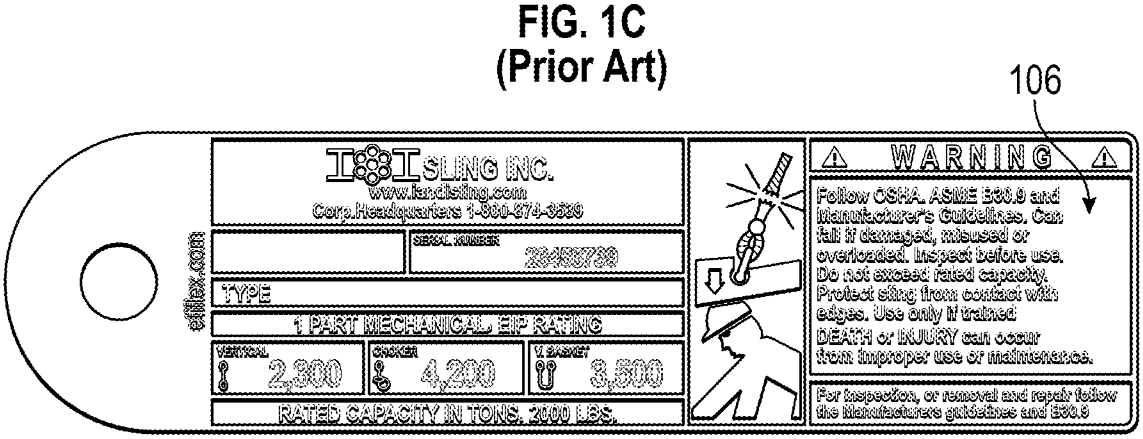
FIG. 1D (Prior Art)
Figure 1E:
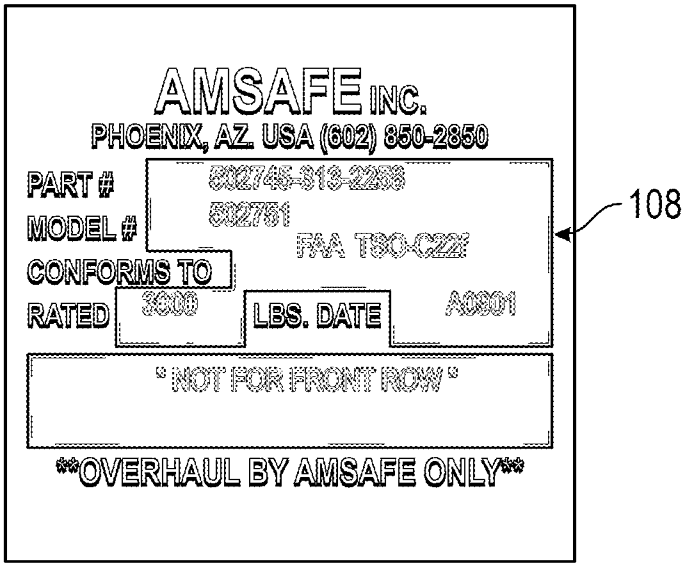
FIG. 1E (Prior Art)
Figure 1F:
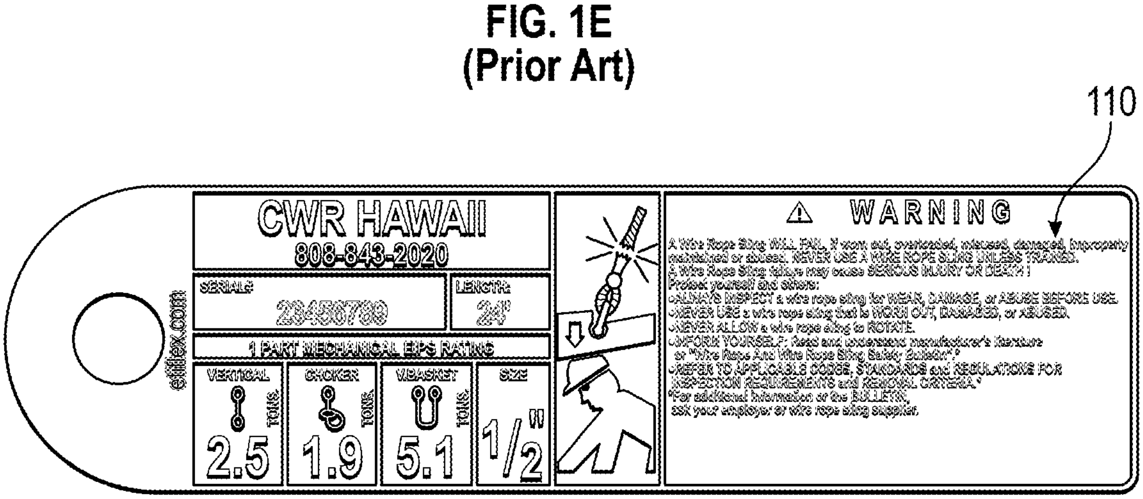
FIG. 1F (Prior Art)
Figure 1G:
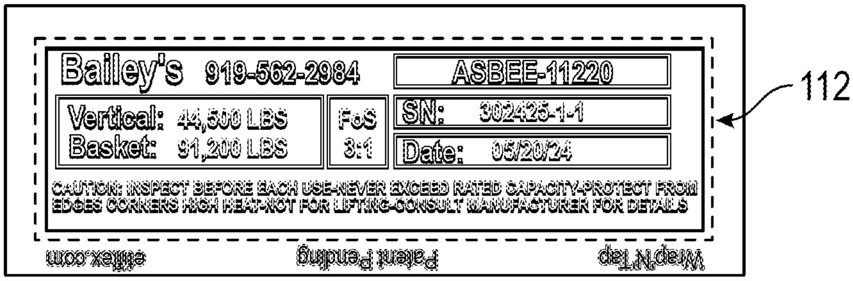
FIG. 1G (Prior Art)
Figure 2A:
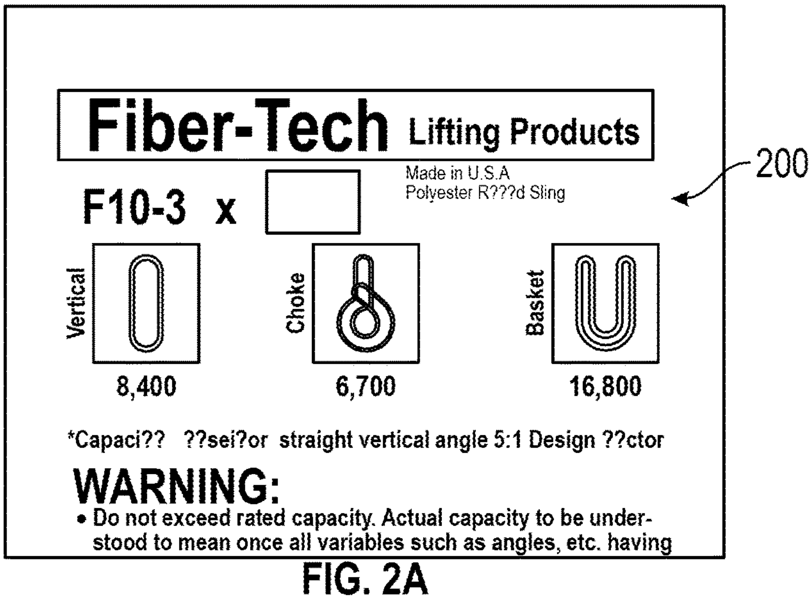
FIG. 2A (Prior Art)
FIGS. 2A-2H (prior art) depict a series of commercially available tags that are used for lifting slings and ropes.
Figure 2B:
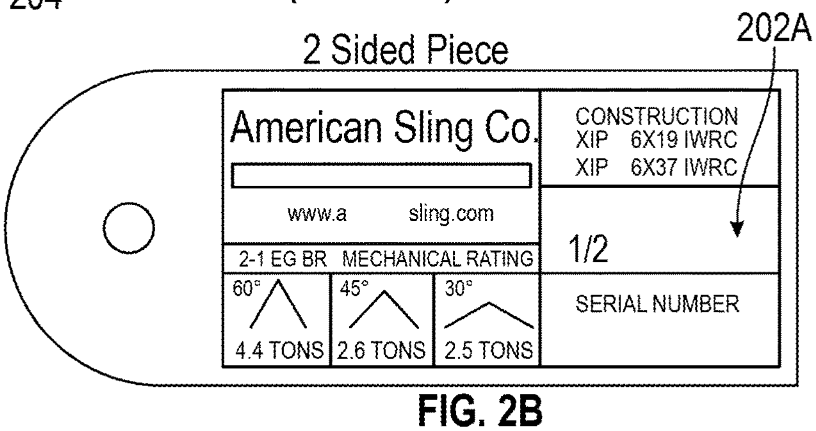
FIG. 2B (Prior Art)
Figure 2C:
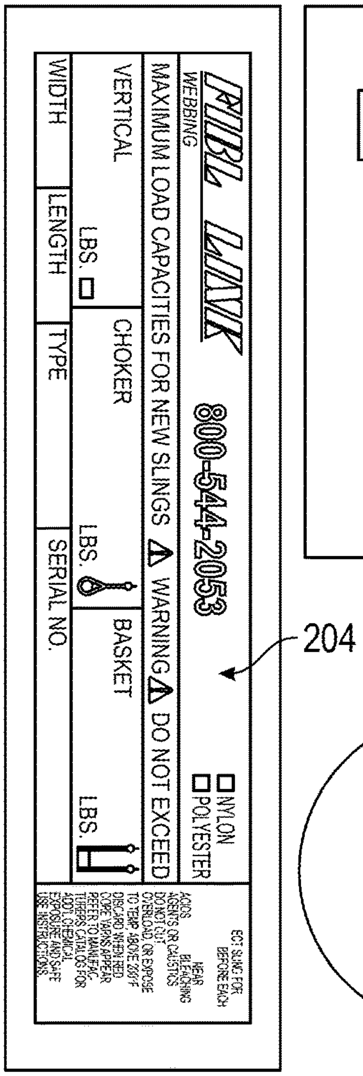
FIG. 2C (Prior Art)
Figure 2D:
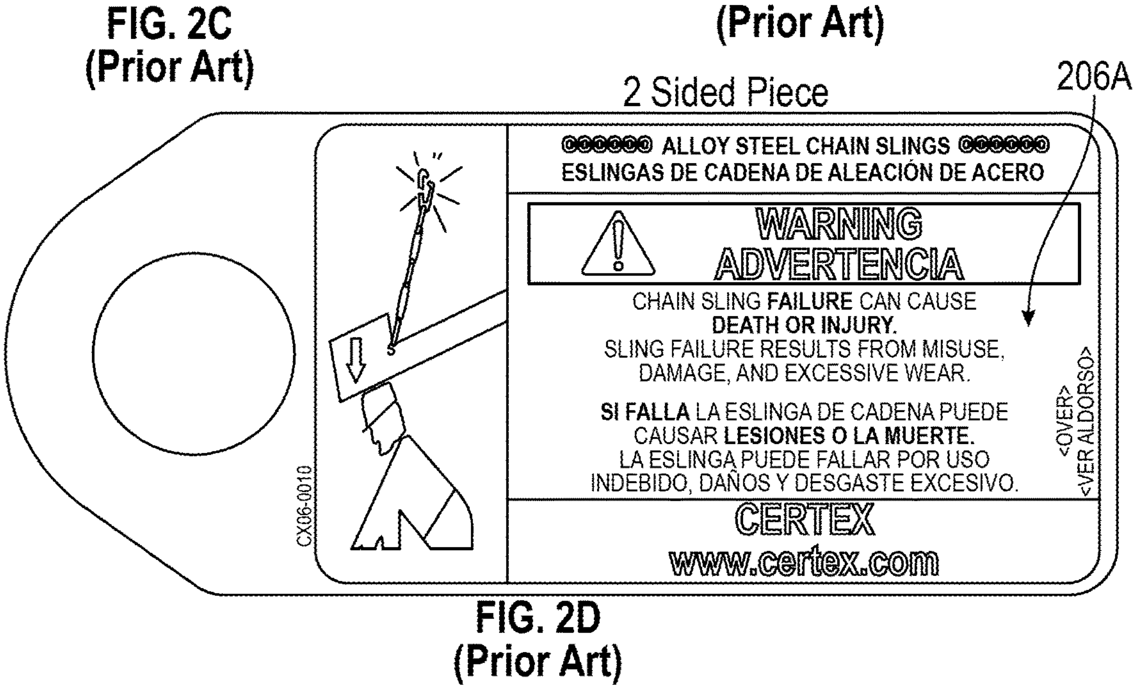
FIG. 2D (Prior Art)
Figure 2E:
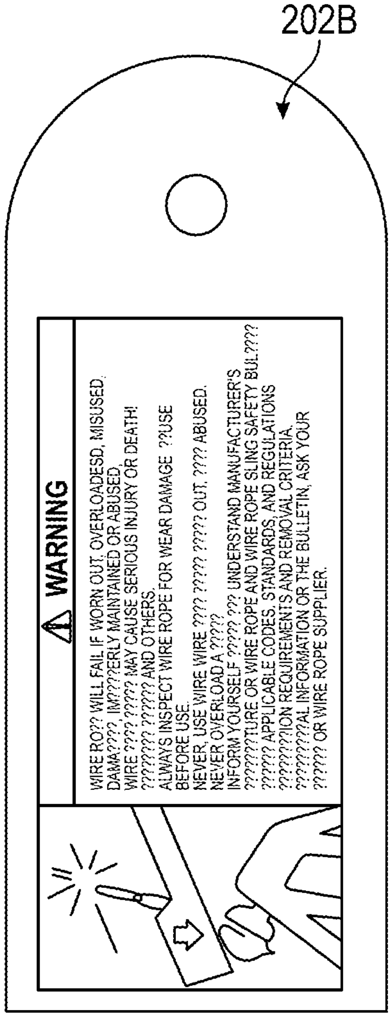
FIG. 2E (Prior Art)
Figure 2F:
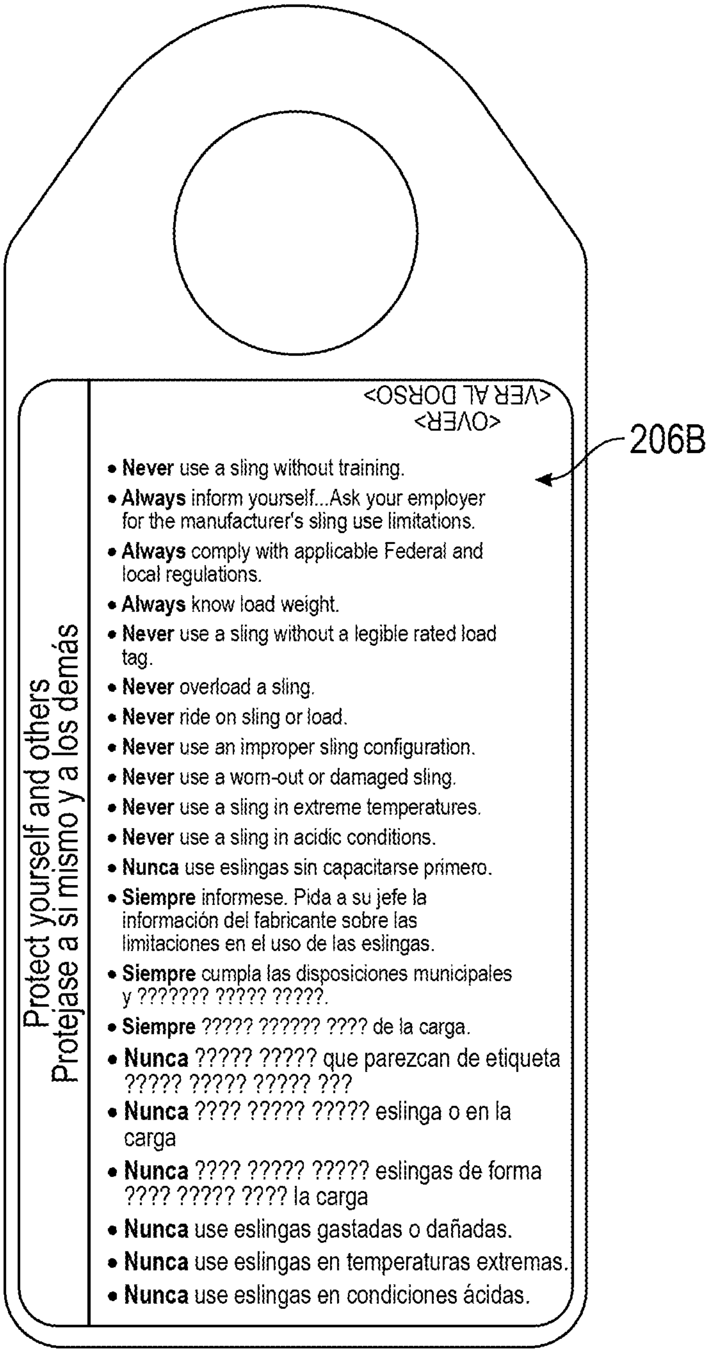
FIG. 2F (Prior Art)
Figure 2G:
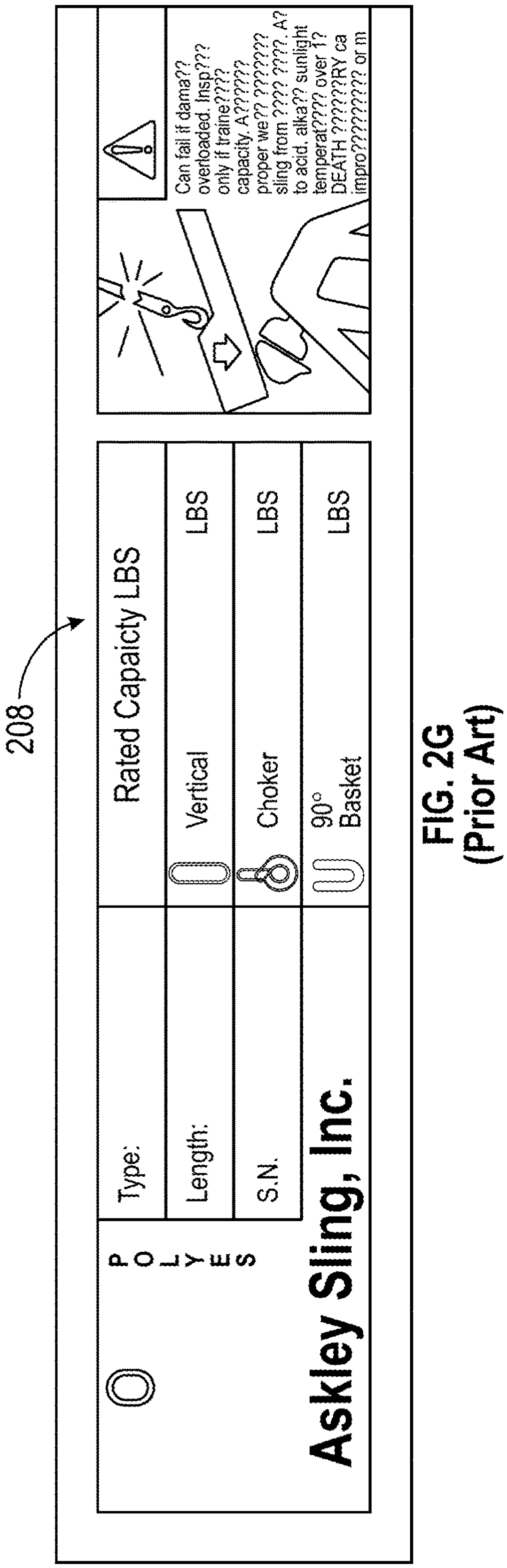
FIG. 2G (Prior Art)
Figure 2H:
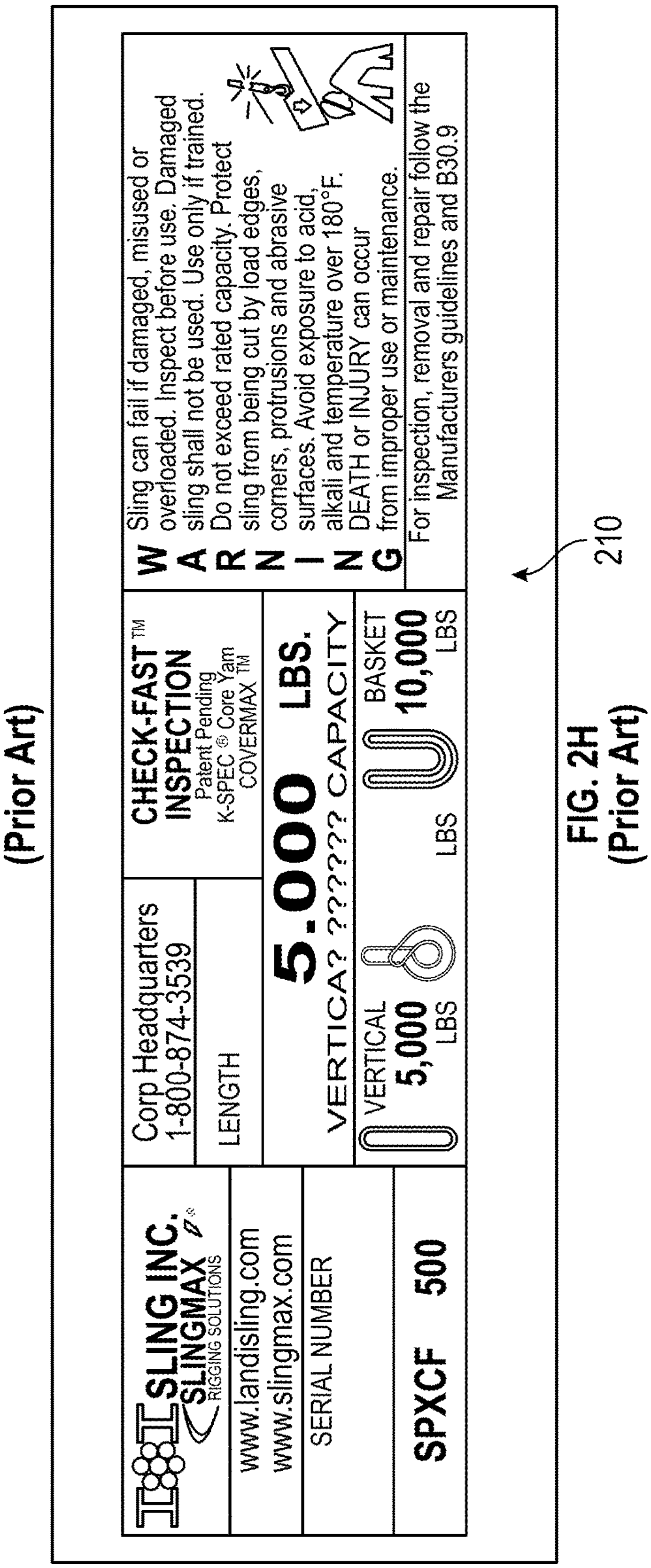
FIG. 2H (Prior Art)
Figure 3:
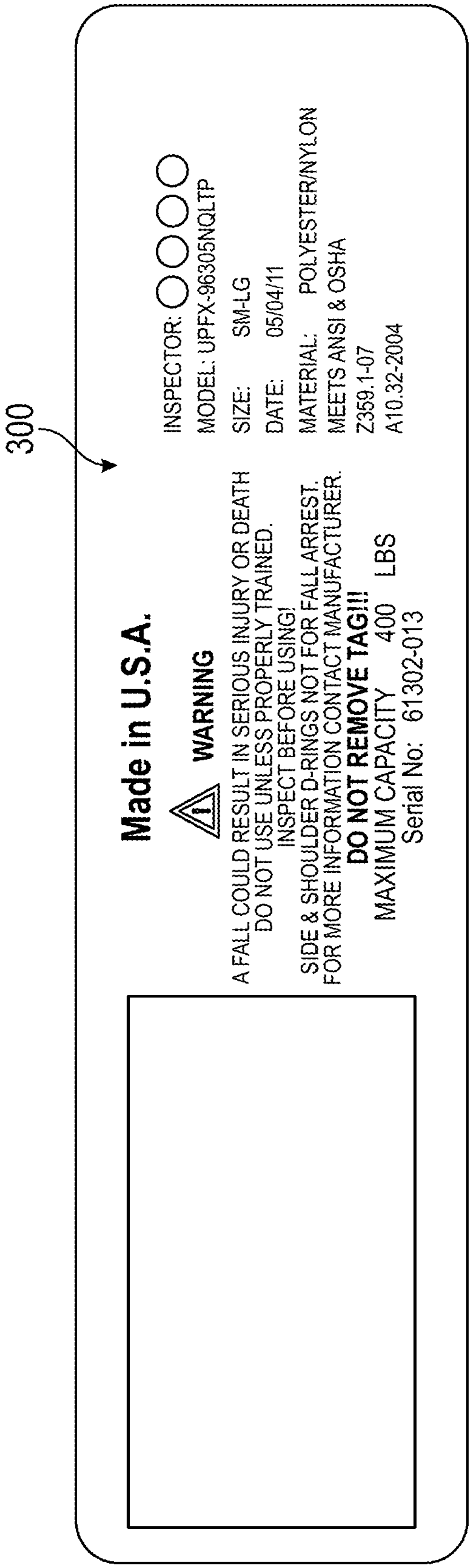
FIG. 3 (prior art) depicts a commercially available printed label that is multi-color and that includes a clear protective cover that is sewn over the label.
Figure 4A:
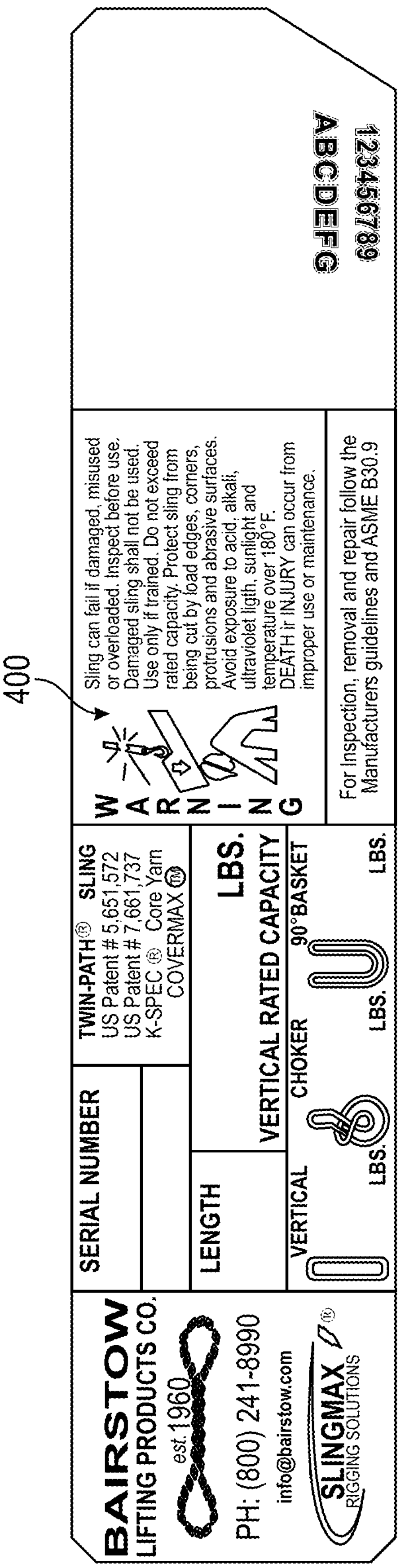
FIG. 4A (Prior Art)
FIGS. 4A-4D (prior art) depict additional types of non-molded, commercially available engraved tag materials.
Figure 4B:
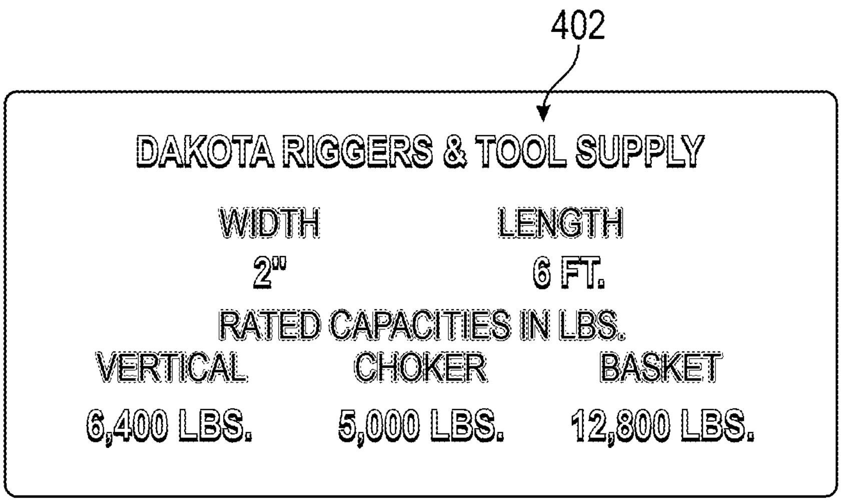
FIG. 4B (Prior Art)
Figure 4C:
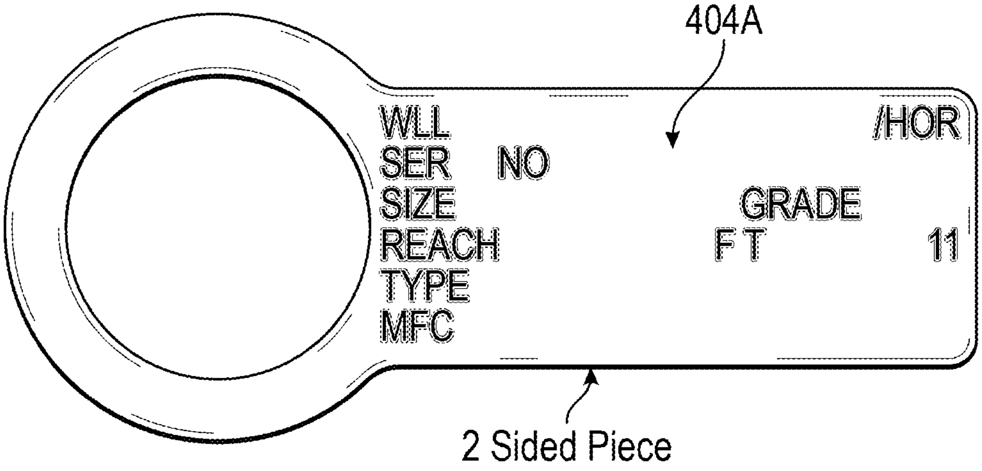
FIG. 4C (Prior Art)
Figure 4D:
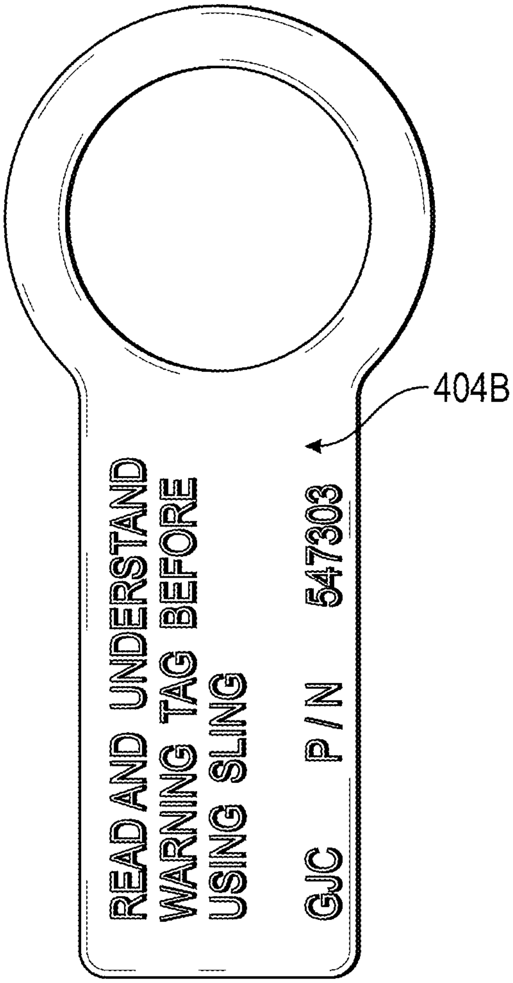
FIG. 4D (Prior Art)
Figure 5:
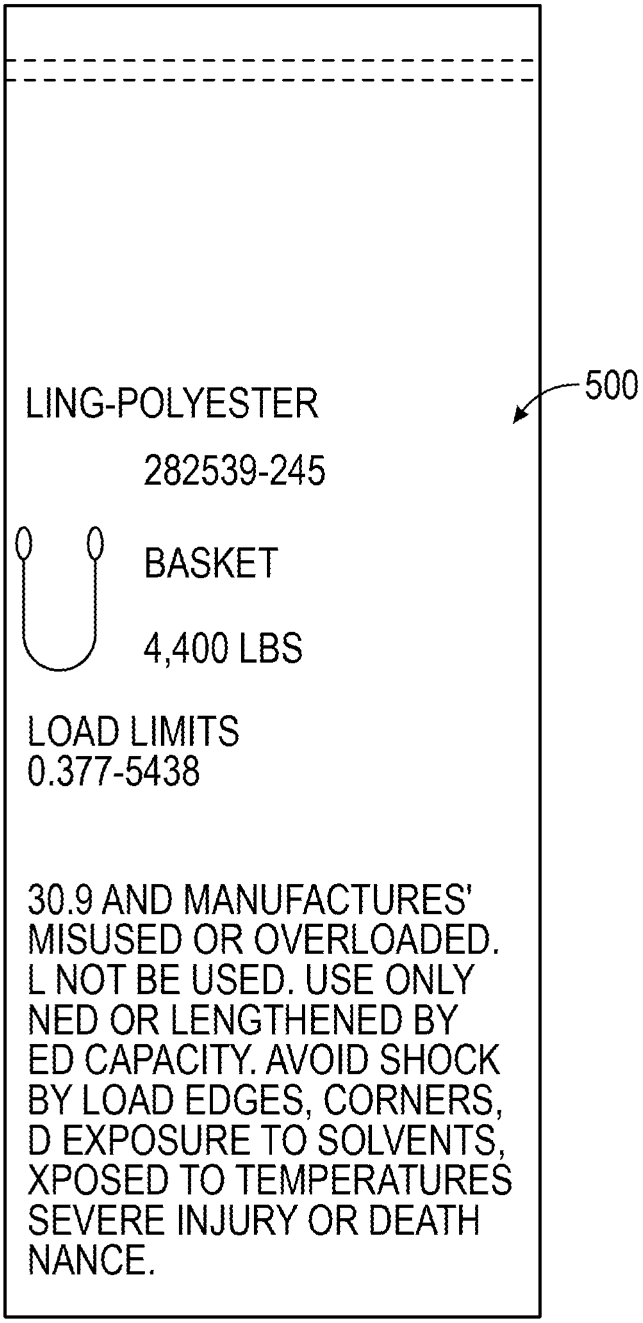
FIG. 5 (Prior Art)
FIG. 5 (prior art) depicts a flexible two-color, commercially available tag material.

The disclosed multi-layer tag system generally includes multiple layers of material, each a separate contrasting color. A laser engraver (e.g., a $CO_2$ laser) can burn through the top layer to establish/capture text and graphics in a second layer below the top layer that is a contrasting color relative to the top layer. Of note, laser engraving is a preferred approach to incorporating variable information onto the disclosed tags. However, other techniques may be used without departing from the spirit and/or scope of the present disclosure, e.g., etching, mechanical engraving and the like. In exemplary embodiments, the top layer is a consistent thickness that is generally large enough to withstand abrasive forces that may be experienced by the top layer of the multi-layer tag in use.

The multi-layer tag is generally fabricated from material (s) that is/are resistant to solvents, petrochemicals, and UV exposure. The material(s) are generally flexible and stitchable. The material(s) used to fabricate the disclosed multi-layer tag can be attached to an item in the field by sewing, pressure sensitive adhesives, acrylic cements, RF welding, and/or with mechanical fastener(s)/grommet(s). The material(s) of the multi-layer tag can also be reinforced with supplemental material(s) for additional tear resistance and pull strength, and can be adapted to permit at least one of piercing and/or punching to capture distinctive identification information for a specific product. Commonly assigned U.S. Pat. No. 11,417,244 provides further detail concerning techniques for capture of distinctive identification information, and the '244 patent is incorporated herein by reference.

Of note, each of the layers may be fabricated from the same (or substantially the same material), with different/contrasting colors. In certain three-layer embodiments, the top and bottom layers may be the same color, and the middle layer may be fabricated from the same material with a contrasting color.

In exemplary embodiments, the multi-layer tag may be fabricated from material(s) such as a rubber, plasticized PVC, a polymer, a silicone, a urethane material, a thermoplastic material, and the like, and can be formed by, e.g., open molding (poured and/or cast), injection molding, thermoforming, radio frequency welding ("RF welding"), and the like. The material(s) of the multi-layer tag can optionally further be reinforced, e.g., with fabrics.

In exemplary embodiments, the multi-layer tag comprises two layers. The top layer is fabricated from a first material. The second/lower layer is fabricated from a second material. In embodiments, the top layer and the second/lower layer are fabricated from the same material, but in different/contrasting colors. In embodiments, the second/lower layer may define a recessed border, and the recessed border may be adapted for stitching. In embodiments, raised text is defined on the recessed border.

In a further exemplary embodiments, the multi-layer tag comprises three layers. The top and bottom layers may be fabricated from a first material. The second/middle layer is fabricated from a second material. In embodiments, the top/bottom layers and the second/intermediate layer are fabricated from the same material, but in different/contrasting colors. In embodiments, in a three layer implementation, the top and bottom layers may be fabricated with the same color. The three layer approach allows two sided deep engraving to the middle layer for the same dark permanent contrast as is provided by the top layer-second/lower layer implementation described above with reference to a two layer implementation.

The disclosed multi-layer tag offers much better definition and deeper engraving over the traditional engraving and also has greatly improved contrast that will not fade over time—resulting in an easier label to read as well as a much more durable and longer lasting medium for capturing/display of relevant information/indicia. Instead of fading away, the engraving actually gets darker with time.

The information/indicia captured on the disclosed multi-layer tags can be at least one of, e.g., a serial number, an in-service date, an inspection date, and the like. The distinctive identification information captured can also be at least one of, e.g., a serial number, an in-service date, an inspection date, an inspection history, a certification number, a compliance status, and the like. The durable material is configured to be detachably secured to the specific product with, e.g., stitching, RF welding, a tie, a wire lanyard, a rope, a mechanical fastener, an adhesive, a hook and loop system, and the like, and is further configured to endure hazardous conditions. In some exemplary embodiments, the means of securing the durable material to the specific product can include, e.g., screws, rivets, nails, braids, heat seals, pressure sensitive adhesives (PSAs), solvent adhesives, Velcro™, and the like. Commonly assigned U.S. Pat. No. 11,417,244 (previously incorporated by reference) provides further detail concerning techniques for securing durable materials to the specific product.

As discussed in commonly assigned U.S. Pat. No. 8,490,882 entitled "Apparatus and Process Including Radio Frequency Identification Devices," radio frequency identification devices ("RFIDs") can be implemented for improved tracking of inventory and/or providing crucial information about a particular item. It should be understood that the disclosed multi-layer tags described herein can be utilized in conjunction with the RFIDs and methods of fabrication as taught by the '882 patent (as applicable), the contents of which are incorporated herein by reference.

Exemplary features and functions of the disclosed multi-layer tag include:

A consistently controlled top engraving layer is a key to success in the disclosed molded product. The raised regions surrounding the engraved areas are significantly thicker than conventional labels, making the information/indicia captured by the engraving process much more durable in use.

The disclosed multi-layer tag—in its fundamental implementation—is entirely 3-D molded, as contrasted with an extruded flat sheet that receives printing to capture relevant information/indicia. The 3-D molding manufacturing process is generally undertaken sequentially, with a first layer (of a first color) molded first, and then a second layer (of a second/contrasting color) molded second atop the first layer. If additional layer(s) are to be included in multi-layer tag product, the additional layer(s) may be sequentially molded after the second layer. As noted previously, a three layer multi-layer tag may be fabricated with outer layers of the same color, and the intermediate layer of a second/contrasting color.

Raised letters for text makes for better abrasion resistance and easier to read. Recessed text can offer even better resistance and, based on its recessed position relative to surrounding non-engraved regions, is further protected from abrasive forces.

Recessed text leaves large surface areas to handle abrasion instead of the small surface area of the tops of text.

Matte finish may be incorporated into the 3-D molded materials, with no gloss or reflection in night lighting, and wet conditions.

Multiple colors in raised text may be provided to accent a message, like "warning" and/or "cautionary" information/indicia (in addition to engraved information/indicia).

Engraving as described herein yields engraved regions that do not fade with time, but instead offer greater contrast, e.g., get darker, with time.

The disclosed multi-layer tags will not mark up, damage, or scratch any item to which it is used on or that comes into contact with.

The disclosed three layer multi-layer tag offers two sided deep engraving, which doubles the size of engraving area and can reduce the cost of tagging by combining two separate labels into one label or can cut a label size significantly-which reduces cost.

In sum, the disclosed multi-layer tags and associated manufacturing methods offer substantial benefits that are not achieved in conventional tag systems, including:

- Meeting a need in the marketplace to solve the current problems with industrial tagging. The need is for someone to offer a tag with a permanent durable marking that can be easily read and adhered to most products. This is especially important where metal engraved tags won't work—e.g., on soft goods.
- Because the disclosed multi-layer tags are designed for laser engravers to cut through the first layer of material to a contrasting back layer, the engraved data will not fade but only get darker with time. This addresses a problem of fading that has been a major weakness with current designs.
- The disclosed multi-layer tag has a top layer that is engraved through that is significantly thicker than any other design, which also results in the engraving being consistently deeper—and therefore more durable and easier to read.
- Because the disclosed multi-layer tags may be designed to mold in a lot of the text, logo and information that is constant, it is much more efficient than laser engraving a blank sheet where everything is engraved, yielding a tag product that captures desired information/indicia that is significantly more durable in use.
- The disclosed multi-layer tag is not a fall hazard, does not create a spark if dropped nor does it conduct electricity.
- The disclosed multi-layer tag will not mark up items that it comes into contact with.
- The disclosed multi-layer tags can be made in any color, as well as in a series/plurality of colors that may be used for color coding equipment and processes.
- The disclosed multi-layer tag allows the "background layer" to be at a lower level than the engraved layer. This lower label can be used for attaching the label—for instance with stitching where the upper engraving layer protects the stitching from abrasion.
- The option of a second area for the same process of laser engraving can be created on the back side for labels that have two sides. This allows a label to be smaller and carry the same amount of information as a one sided label.
- The increased efficiency and time savings result in significant cost savings and labor savings for the user.

With reference to FIGS. 6A-6D, multi-layer tags 600, 602, 604, 606 are depicted. Each of multi-layer tags 600, 602, 604, 606 features a multi-level, multi-color label that captures information/indicia through high-definition deep engraving according to the present disclosure. The exemplary multi-layer tags 600, 602, 604, 606 also allow an option for engraving on the back side, e.g., when ordered that way by customer(s). The deep engraving and the tag is durable for outdoor, and heavy duty industrial use.

Figure 6A:
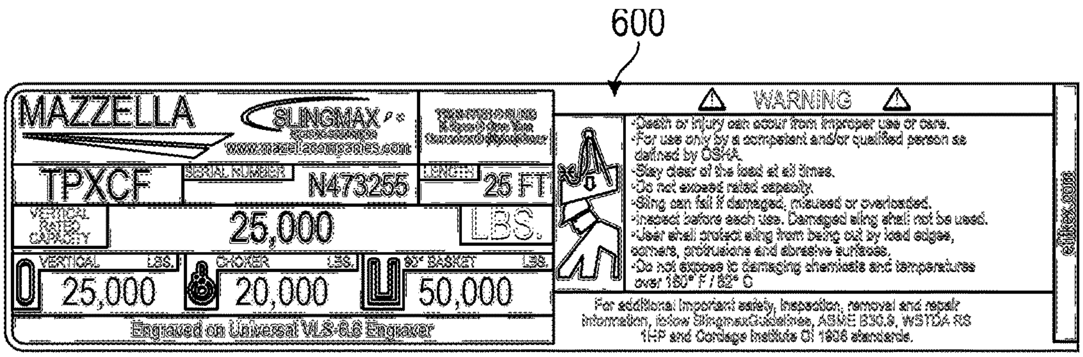
FIGS. 6A-6D depict multi-layer tags featuring a multi-level, multi-color label that captures information/indicia through high-definition deep engraving according to the present disclosure.
Figure 6B:
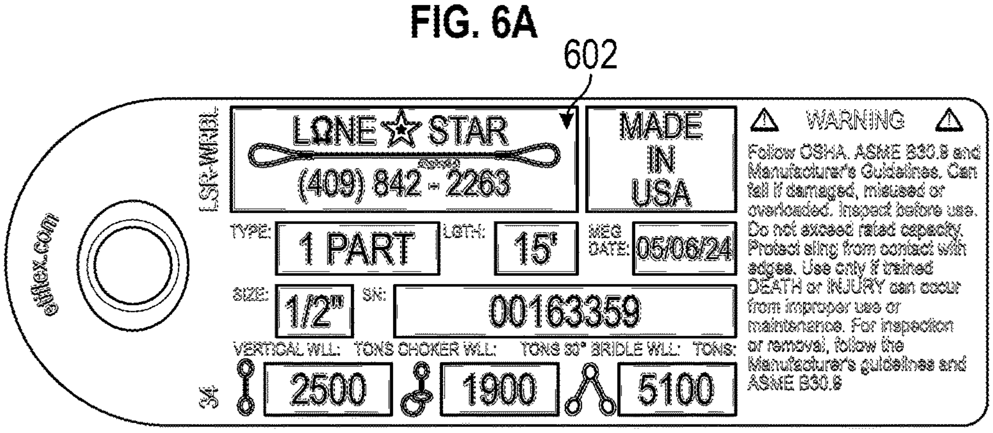
Figure 6C:
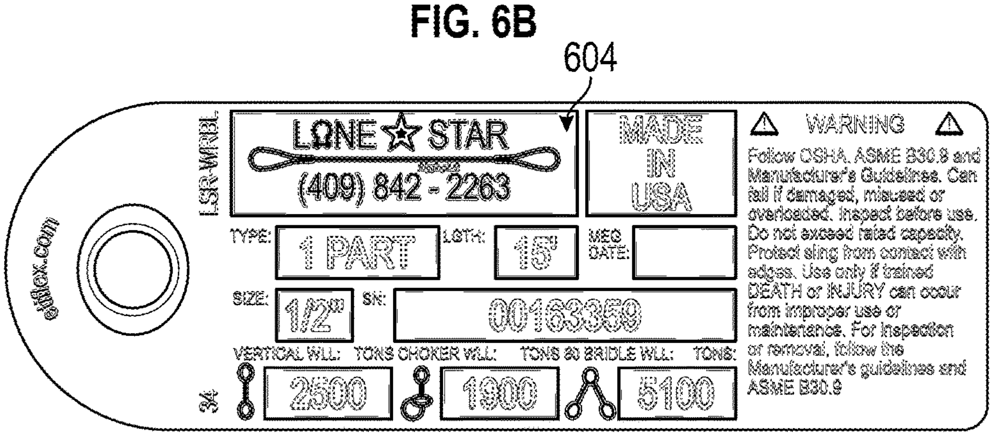
Figure 6D:
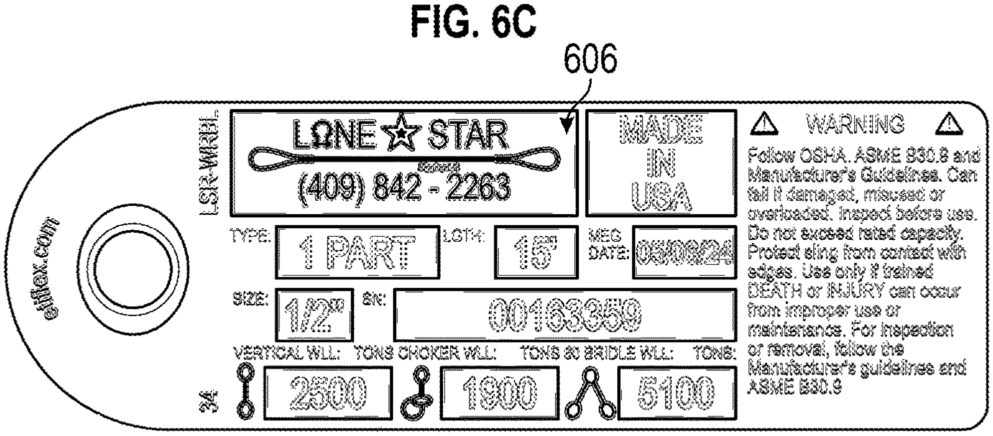
Figure 7A:
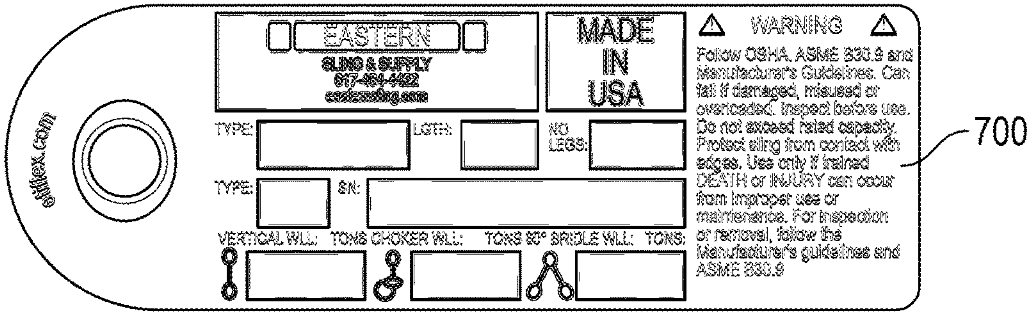
FIGS. 7A-7E depict multi-layer tags that feature a multi-level, multi-color label that captures information/indicia through high-definition deep engraving.
Figure 7B:
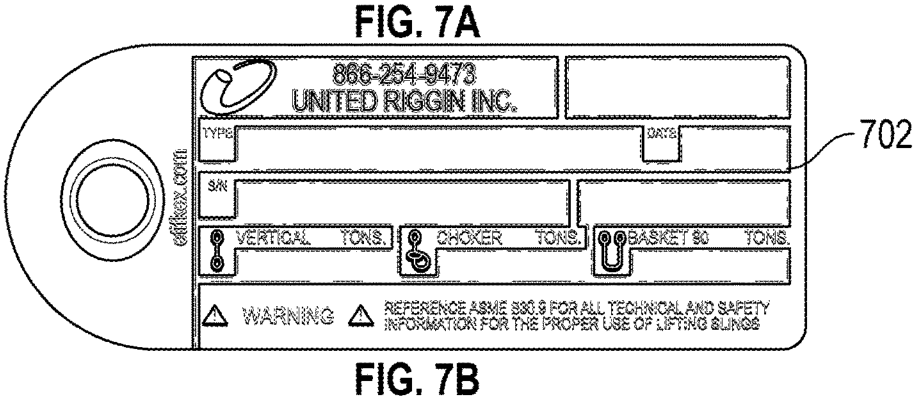
Figure 7C:
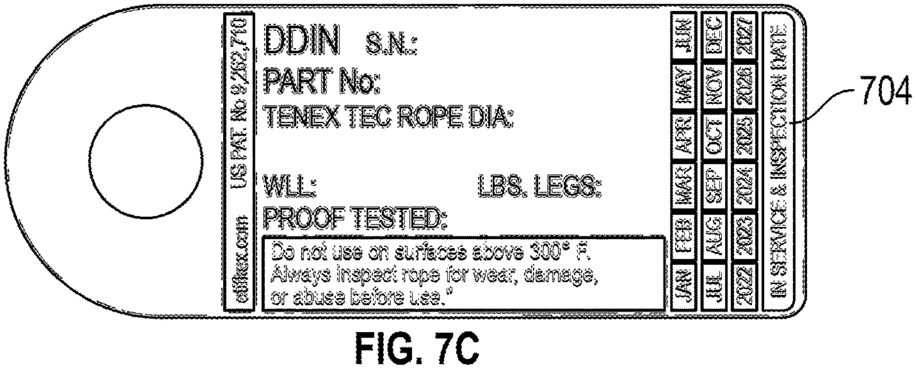
Figure 7D:
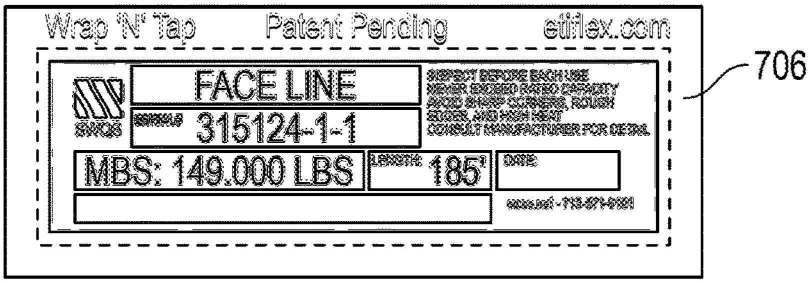
Figure 7E:
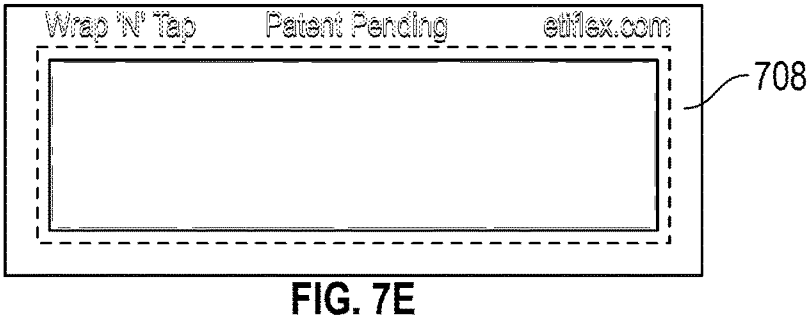

The multi-layers tags 600, 602, 604, 606 depicted in FIGS. 6A-6D have a raised text molded-in in a separate color from the recessed and engraved information. Of note, the three tags that form the basis of FIGS. 6B-6D are each orange tags where the engraving shows different amounts of brown. Tag 606 that forms the basis of FIG. 6D has a greater amount of brown; tag 604 that forms the basis of FIG. 6C has less brown and, in tag 602, that forms the basis of FIG. 6B, the brown color is mostly gone. This evolution demonstrates that when the brown fades in the noted embodiment, it leaves behind the dark second layer. This phenomenon should be contrasted with the prior art tags included in FIGS. 1A-1G where, as the engraving fades, it gets lighter and lighter until it is gone entirely, and the original color of that layer is what is left, so that the original marking is lost/illegible.

With reference to FIGS. 7A-7E, multi-layer tags 700, 702, 704, 706, 708 feature a multi-level, multi-color label that captures information/indicia through high-definition deep engraving. Multi-layer tags 700, 702, 704, 706, 708 also allow an option for engraving on the back side, e.g., when ordered that way. The deep engraving and the tag itself are durable for outdoor, and heavy duty industrial use. Multi-layer tags 700, 702, 704, 706, 708 may feature a raised text molded-in in a separate color from the recessed and engraved information. The multi-layer tags 700, 702, 704, 706, 708 may also include second/lower layers that define a recessed border region upon which information may be captured.

With reference to FIGS. 8A-8F, FIG. 8A depicts a blank tag (800), FIGS. 8B-8C depict tags fully engraved (802, 804), FIG. 8D depicts a tag with pre-molded information (806), FIGS. 8E-8F depict tags in the form that they could be supplied to a user (808, 810). Tags 808, 810 include molded-in information with recessed text in black and raised molded-in text in a contrasting color. These tags show how the user may receive the tag ready for engraving of the variable information (e.g., part #, capacity, etc.).

Figure 9:
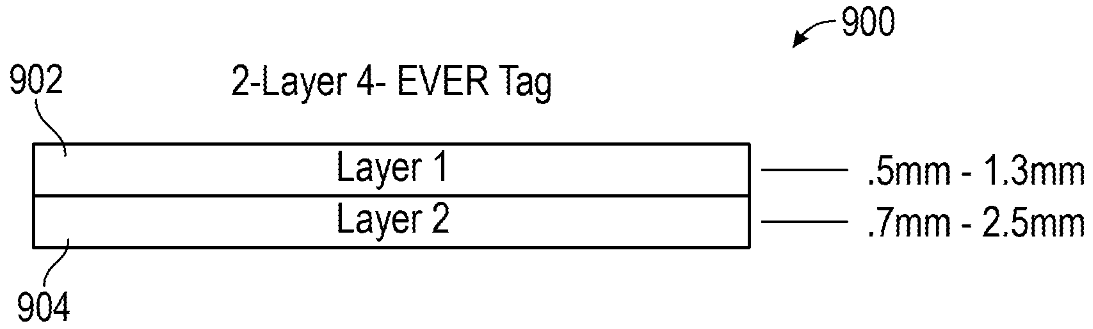
FIG. 9 is a schematic cross-sectional view showing a two layer multi-layered tag according to the present disclosure.

With reference to FIG. 9, a schematic cross-sectional view of a two layer multi-layered tag 900 according to the present disclosure is provided. Variable information may be laser engraved through the top layer 902, thereby defining engraved regions that expose the second/lower layer 904. As schematically depicted in FIG. 9, in exemplary embodiments, the thickness of the first/top layer 902 may be 0.5 mm to 1.3 mm, and the thickness of the second/lower layer 904 may be 0.7 mm to 2.5 mm (although variations on the noted dimensions may be implemented without departing from the spirit or scope of the present disclosure).

Figure 10:
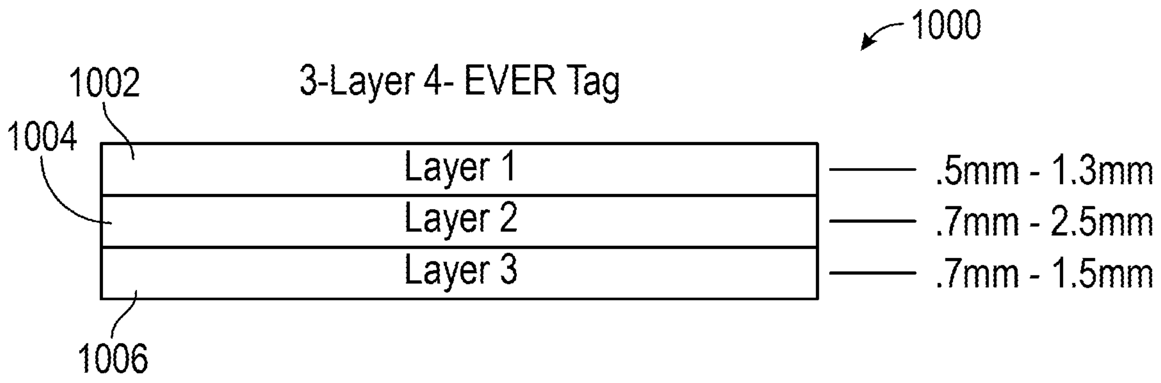
FIG. 10 is a schematic cross-sectional view showing a three layer multi-layered tag according to the present disclosure. Variable information may be laser engraved through the top and bottom layer, thereby defining engraved regions that expose the second layer (which functions as a middle layer in this embodiment) from top and from bottom. As schematically depicted in FIG. 10, in exemplary embodiments, the thickness of the first/top layer may be 0.5 mm to 1.3 mm, the thickness of the second/lower layer may be 0.7 mm to 2.5 mm and the thickness of the third layer may be 0.7 mm to 1.5 mm (although variations on the noted dimensions may be implemented without departing from the spirit or scope of the present disclosure).

With reference to FIG. 10, a schematic cross-sectional view of a three layer multi-layered tag 1000 is provided according to the present disclosure. Variable information may be laser engraved through the top layer 1002 and bottom layer 1006, thereby defining engraved regions that expose the second layer 1004 (which functions as a middle layer in this embodiment) from top and from bottom. As schematically depicted in FIG. 10, in exemplary embodiments, the thickness of the first/top layer 1002 may be 0.5 mm to 1.3 mm, the thickness of the second/lower layer 1004 may be 0.7 mm to 2.5 mm and the thickness of the third layer 1006 may be 0.7 mm to 1.5 mm (although variations on the noted dimensions may be implemented without departing from the spirit or scope of the present disclosure).

Thus, in exemplary embodiments, the present disclosure provides a multi-layer tag that includes a first/top layer fabricated from a first material that is characterized by a first color and a second/lower layer in abutting relation to the first/top layer, the second/lower layer fabricated from a second material that is characterized by a second color. The first/top layer may include engraved region(s) that expose portion(s) of the second/lower layer. The first color may be a contrasting color relative to the second color. At least one of the first/top layer and the second/lower layer may be pre-molded with information.

The engraving of the multi-layer tag may be effectuated by way of laser engraving. The first material may be the same as or different from the second material.

A third layer may be fabricated from a third material that is characterized by a third color. The third layer may be in abutting relation to the second/lower layer on a side opposite the abutment between the first/top layer and the second/lower layer. The third layer may include laser-engraved region(s) that expose portion(s) of the second/lower layer.

The second/lower layer may define a recessed border. The recessed border may be adapted for stitching. Raised text may be defined on the recessed border.

At least one of the first/top layer and the second/lower layer may include a reinforcing material to improve tear resistance and/or pull strength.

The multi-layer tag may include an RFID transmitter embedded therein.

A method for fabricating a multi-layer tag is provided that may include molding a first/top layer fabricated from a first material that is characterized by a first color, molding a second/lower layer in abutting relation to the first/top layer, the second/lower layer fabricated from a second material that is characterized by a second color that is a contrasting color relative to the first color, and engraving the first/top layer to define engraved region(s) that expose portion(s) of the second/lower layer.

The engraving may be effectuated by way of laser engraving. The first material may be the same as or different from the second material.

The method may include molding a third layer from a third material that is characterized by a third color, the third layer in abutting relation to the second/lower layer on a side opposite the abutment between the first/top layer and the second/lower layer.

The molding of at least one of the first/top layer and the second/lower layer may include pre-molding of information therein or thereon. At least one of the first/top layer and the second/lower layer may include a reinforcing material to improve tear resistance and/or pull strength. An RFID transmitter my be embedded with respect to at least one of the first/top layer and the second/lower layer.

A multi-layer tag may be provided according to the present disclosure that includes a first/top layer fabricated from a first material that is characterized by a first color, a second/lower layer in abutting relation to the first/top layer, the second/lower layer fabricated from a second material that is characterized by a second color, wherein the first/top layer includes engraved region(s) that expose portion(s) of the second/lower layer, wherein the first color is a contrasting color relative to the second color, and wherein the second/lower layer defines a recessed border.

The recessed border may be adapted for stitching. Raised text may be defined on the recessed border. The engraving may be effectuated by way of laser engraving.

Although the present disclosure describes exemplary implementations of the disclosure multi-layered tag, the present invention is not limited by or to such exemplary implementations.

The invention claimed is:

1. A multi-layer tag, comprising:

a. a first/top layer fabricated from a first material that is characterized by a first color;

b. a second/lower layer in abutting relation to the first/top layer, the second/lower layer fabricated from a second material that is characterized by a second color;

wherein the first/top layer includes one or more engravable regions whereby one or more selected portions of the second/lower layer may be exposed through the first/top layer;

wherein the first color is a contrasting color relative to the second color; and wherein at least a portion of the second/lower layer is pre-molded with raised indicia spaced from the first/top layer, wherein the raised indicia is characterized by a color that contrasts relative to the second color of the second/lower layer.

2. The multi-layer tag according to claim 1, wherein the one or more engravable regions are adapted to be engraved by way of laser engraving.

3. The multi-layer tag according to claim 1, wherein the first material is the same as the second material.

4. The multi-layer tag according to claim 1, further comprising a third layer fabricated from a third material that is characterized by a third color, the third layer in abutting relation to the second/lower layer on a side opposite the abutment between the first/top layer and the second/lower layer.

5. The multi-layer tag according to claim 1, wherein the second/lower layer defines a recessed border.

6. The multi-layer tag according to claim 5, wherein the recessed border includes stitching.

7. The multi-layer tag according to claim 5, wherein the raised indicia are pre-molded on the recessed border.

8. The multi-layer tag according to claim 1, wherein at least one of the first/top layer and the second/lower layer includes a reinforcing material to improve tear resistance and/or pull strength.

9. The multi-layer tag according to claim 1, further comprising an RFID transmitter embedded therein.

10. A multi-layer tag, comprising:

a. a first/top layer fabricated from a first material that is characterized by a first color;

b. a second/lower layer in abutting relation to the first/top layer, the second/lower layer fabricated from a second material that is characterized by a second color;

wherein the first/top layer includes one or more engravable regions whereby one or more selected portions of the second/lower layer may be exposed through the first/top layer;

wherein the first color is a contrasting color relative to the second color; and wherein at least a portion of the second/lower layer defines a recessed border that is pre-molded with raised indicia spaced from the first/top layer, wherein the raised indicia is characterized by a color that contrasts relative to the second color of the second/lower layer.

11. The multi-layer tag according to claim 10, wherein the recessed border includes stitching.

12. The multi-layer tag according to claim 10, wherein the one or more selected portions of the second/lower layer may be exposed through the first/top layer by way of laser engraving.

* * * * *